United States Patent [19]

Nishimoto

[11] Patent Number: 5,157,756
[45] Date of Patent: Oct. 20, 1992

[54] OPTICAL WAVEGUIDE CIRCUIT WITH INTERSECTIONS

[75] Inventor: Hiroshi Nishimoto, Tokyo, Japan
[73] Assignee: NEC Corporation, Tokyo, Japan
[21] Appl. No.: 574,871
[22] Filed: Aug. 30, 1990
[30] Foreign Application Priority Data Aug. 30, 1989 [JP] Japan .................................. 1-226029

[51] Int. Cl.[5] ................................................. G02B 6/10
[52] U.S. Cl. ........................................ 385/129; 385/14
[58] Field of Search ............... 350/96.11, 96.12, 96.14, 350/96.15; 385/129-132, 39, 45, 14

[56] References Cited

U.S. PATENT DOCUMENTS

| | | | |
|---|---|---|---|
| 4,130,342 | 12/1978 | McMahon | 350/96.14 |
| 4,382,655 | 5/1983 | Jamieson | 350/96.12 |
| 4,693,546 | 9/1987 | Lorenzo et al. | 350/96.15 X |
| 4,693,547 | 9/1987 | Soref et al. | 350/96.15 X |
| 4,728,167 | 3/1988 | Soref et al. | 350/96.15 X |
| 4,961,619 | 10/1990 | Hernandez-Gil et al. | 385/132 |

OTHER PUBLICATIONS

T. O. Murphy et al., "Reduced Waveguide Intersection Losses for Large Tree Structured Ti:LiNbO$_3$ Switch Arrays", Inst. of Elec. Information and Communications Engineers-technical report, OQE 88-147, 1988
"Reduction of Crosstalk and Losses of Intersecting Waveguide", Electronics Letters, vol. 25, No. 11, May 25, 1989, pp. 730-731.
"Electro-Optic X-Switch Using Single-mode Ti:LiNbO$_3$ Channel Waveguides", Electronics Letters, vol. 19, No. 14, Jul. 7, 1983, pp. 553-554.

*Primary Examiner*—John D. Lee
*Attorney, Agent, or Firm*—Sughrue, Mion, Zinn, Macpeak & Seas

[57] ABSTRACT

An optical waveguide circuit comprises intersections each including two optical waveguides which intersect with each other by a predetermined intersecting angle. The intersection includes an island region and a peripheral region surrounding the island region. The peripheral region has a refractive index which is lower than that of optical waveguides, so that an intersecting loss is lowered.

6 Claims, 3 Drawing Sheets

OPTICAL WAVEGUIDE CIRCUIT WITH INTERSECTIONS

FIELD OF THE INVENTION

This invention relates to an optical waveguide circuit with intersections, and more particularly to, an optical circuit having intersecting optical waveguides.

BACKGROUND OF THE INVENTION

As the practical use of optical communication systems has been promoted in these days, optical communication systems are required to have a large amount of communication capacity and multi-functions such as switching, dividing, coupling, etc. of optical signals. In such an optical communication system, an optical switch is used for the changing-over of optical transmission lines and the switching of a network. In particular, an optical matrix switch, which comprises optical waveguide switches which are integrated to be positioned in an optical circuit composed of optical waveguides on a substrate, is a key device for the change-over and the switching of optical signals. This optical matrix switch is required to have a property of low loss in the application to a practically used optical communication system. For this purpose, an optical circuit including optical waveguides is required to have a property of low loss.

One type of an optical circuit has been described in "the technical report, OQE 88-147, 1988 of the Institute of Electronics Information and Communication Engineers". In fabricating this optical circuit, Ti is diffused into a Z-cut $LiNbO_3$ substrate to provide belt-shaped regions of a higher refractive index than that of the substrate by a predetermined pattern, so that single mode optical waveguides are obtained to have intersections on the substrate. The optical waveguides are made to be proximate by a distance as small as several $\mu m$, so that optical directional couplers are provided thereon.

In this report, it is explained that losses of optical signals are different among optical waveguide transmission lines, and the difference of the losses is dependent upon the number of intersections provided for each optical waveguide transmission path. The intersecting loss is reported to be approximately 0.35 dB for TM polarization at an intersecting angle of 7° (seven degrees), and the number of the intersections ranges from 0 to 14 for each optical waveguide transmission path. Therefore, the difference of approximately 5 dB occurs in transmission loss between the optical waveguide transmission paths having no intersection and 14 intersections. As a matter of course, this intersecting loss is required to be low, so that loss of this optical device is totally decreased.

This intersecting loss occurs due to a phenomenon that an optical signal propogated through an optical waveguide is converted at an intersection from single mode to multi mode, and is again converted after the intersection from multi-mode to single mode. More precisely, this mode conversion occurring at the intersection, and a coupling of a signal light propagated through an optical waveguide to another optical waveguide for forming an intersection provide the intersecting loss.

The reduction of this intersecting loss has been discussed on pages 553 and 554 of "Electronics Letters, Vol. 19, Nov. 14, 1983" by A. Neyer. In this report, the intersecting loss is decreased by providing intersections each having a refractive index higher than that of optical waveguides.

However, this structure has a disadvantage in that it is impossible to provide the intersections having the higher refractive index simultaneously with the formation of optical waveguides of a substrate, so that a step of providing the intersections having the higher refractive index is additionally carried out, and in that it is required to control a refractive index of intersections with a high precision.

Another discussion has been described on pages 730 and 731 of "Electronics Letters, Vol. 25, Nov. 11, 1989" by K. Aretz et al. In this report, it is proposed that waveguides are tapered in a crossing area to reduce crosstalk and loss.

However, this proposed structure has a disadvantage in that the reduction of the intersecting loss is not realized at an intersecting angle of more than 7° (seven degrees) which is ordinarily adopted in an optical device, so that it can not be applied to an ordinary optical device, although the effect is obtained at an intersecting angle of less than 6° (six degrees). Furthermore, additional loss occurs in the tapered waveguides, so that a property of largely decreased loss is not obtained.

A still further structure of intersections has been described in "International Topical Meeting on Photonic Switching, Technical Digest, PD 13-1, Mar. 1, 1989" by T. O. Murphy et al. In this report, an intersection having a modified structure of optical waveguides is proposed.

However, this structure has a disadvantage in that its configuration is complicated, and it is necessary to define an optimum structure for each intersecting angle. As a result, it is difficult to design and fabricate an optical waveguide circuit.

SUMMARY OF THE INVENTION

Accordingly, it is an object of this invention to provide an optical waveguide circuit with intersections which is easily fabricated.

It is another object of this invention to provide an optical waveguide circuit with intersections having a property of low loss even at an intersecting angle of more than 6° (six degrees).

According to this invention, an optical waveguide circuit with intersections comprises a plurality of optical waveguides provided on a substrate, intersections each provided by two optical waveguides among the plurality of the optical waveguides, the two optical waveguides intersecting with each other by a predetermined intersecting angle; wherein each of the intersections includes an island region, and a peripheral region which is provided at a periphery of the island region, the peripheral region having a refractive index which is lower than that of the plurality of the optical waveguides.

As apparent from the above, an optical waveguide circuit with intersections according to this invention has the peripheral regions, each of which is formed at the outer area surrounding each of the island regions, and has a refractive index lower than that of each optical waveguide. An experiment conducted by the inventor, has confirmed that intersecting losses are decreased at the intersections by the refractive index structure. As described before, mode conversion occurs at the intersections in the aforementioned conventional structure, because a width of the optical waveguides is substantially enlarged at the intersections. On the other hand, a width of the optical waveguides is not enlarged in this invention, because the peripheral regions are of a refractive index which is lower than that of the optical waveguides. As a result, the intersections are much more appropriate in structure for single mode in this invention as compared to the conventional intersections. Consequently, multi-mode does not occur, or occurs with a small proportion at the intersections in this invention, even if an intersecting angle changes in a range. For this reason, losses based on mode conversion, mode coupling, signal coupling to an intersecting optical waveguide are decreased, so that the intersecting loss is much lowered without being affected by an intersecting angle.

BRIEF DESCRIPTION OF THE DRAWINGS

This invention will be explained in more detail in conjunction with appended drawings, wherein.

DESCRIPTION OF THE PREFERRED EMBODIMENT

Before explaining an optical waveguide circuit in the preferred embodiment according to the invention, the aforementioned conventional optical waveguide circuit which has been described in "The Institute of Electronics Information and Communication Engineers" will be explained in FIGS. 1A and 1B.

Figure 1A:
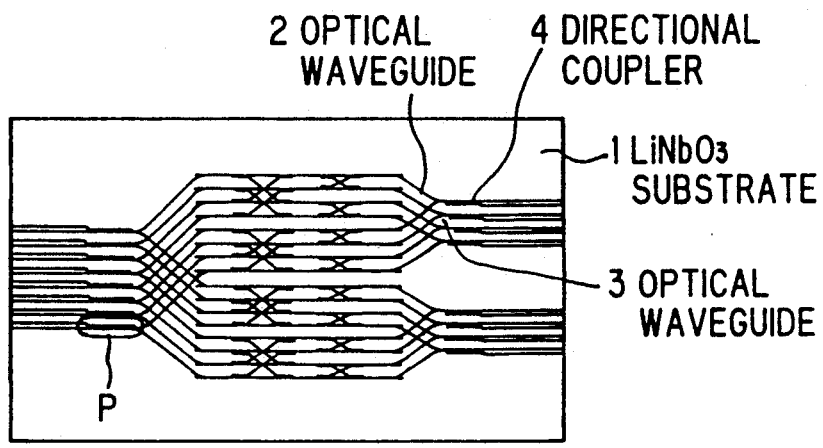
FIG. 1A is a plan view showing a conventional optical waveguide circuit.

FIG. 1A shows the conventional optical waveguide circuit of a 8×8 matrix optical switch which comprises a Z-cut substrate 1 of $LiNbO_3$, and optical waveguides 2 and 3 provided on the substrate 1 with the diffusion of Ti thereinto by a predetermined pattern. FIG. 1B shows a portion of the optical waveguide circuit indicated by the letter P in FIG. 1A. In this enlarged portion P, the optical waveguides 2 and 3 are made to be proximate to each other by a parallel distance of several $\mu m$. Thus, an optical directional coupler 4 is obtained. This optical directional coupler 4 is controlled by a voltage applied across control electrodes 5 which are provided on the optical waveguides 2 and 3 by the presence of a buffer layer (not shown) therebetween. The optical waveguide 2 intersects with an optical waveguide to provide an intersection 10 having an intersecting angle $\theta$. The number of such directional couplers 4 which are provided on the substrate 1 is sixty-four to provide the 8×8 matrix optical switch.

Figure 1B:
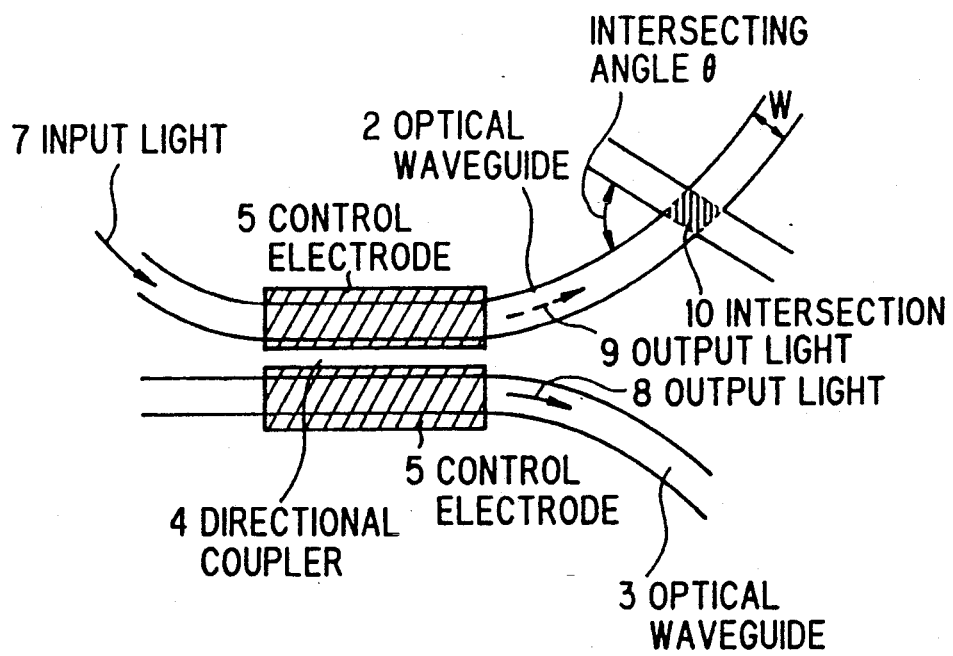
FIG. 1B is an enlarged explanatory view showing a directional coupler and an intersection in the conventional optical waveguide circuit.

In the directional coupler 4 as shown in FIG. 1B, an input light 7 supplied to the optical waveguide 2 is coupled in light energy to the optical waveguide 3, as the input light 7 is transmitted through the optical waveguide 2, when no voltage is applied across the control electrode 5, so that an output light 3 is obtained by the optical waveguide 3, after the light is transmitted through the directional coupler 4. On the other hand, when a predetermined voltage is applied across the control electrodes 5, a refractive index of the optical waveguides 2 and 3 changes, so that the mismatching of phase speeds occurs between transmitting modes of the waveguides 2 and 3 which results in the change of coupling state between the waveguides 2 and 3. Consequently, the input light 7 is not coupled from the waveguide 2 to the waveguide 3, so that an output light 9 is obtained at an opposite end of the waveguide 2.

However, the aforementioned disadvantages occur in this optical waveguide circuit of the 8×8 matrix optical switch, although these are not repeatedly explained here.

Figure 2:
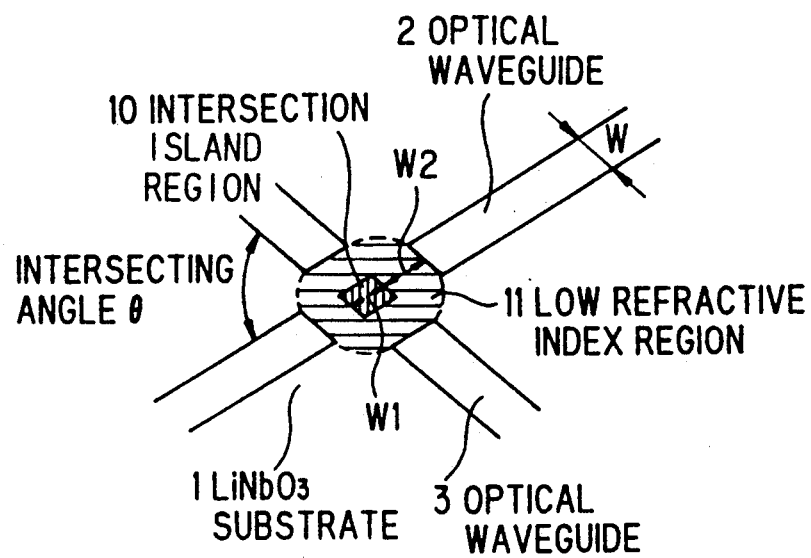
FIG. 2 is a partial explanatory view showing an intersection of an optical waveguide circuit in a preferred embodiment according to the invention.

FIG. 2 shows an intersection in an optical waveguide circuit in the preferred embodiment according to the invention. This intersection comprises two optical waveguides 2 and 3 which intersect with each other by an intersecting angle $\theta$. These waveguides 2 and 3 are provided on a Z-cut substrate 1 of $LiNbO_3$ to have a width W of approximately 3 to 10 $\mu m$ by thermal-diffusion of Ti into the substrate 1 at a temperature of approximately 900° to 1100° C. for several hours. At this intersection, an island region (intersecting portion) 10 having the approximately same refractive index as a high refractive index of the waveguides 2 and 3, and a peripheral region 11 having a refractive index lower than that of the waveguides 2 and 3 are provided, such that the island region 10 is formed to have a width $W_1$ of approximately 3 to 10 $\mu m$ which is the same as that of the waveguides 2 and 3, while the peripheral region 11 is formed to have a width $W_2$ of approximately 0.2 to 5 $\mu m$. For instance, the peripheral region 11 is obtained by a method, in which Ti is diffused into the substrate 1 by a pattern of the waveguides 2 and 3 excepting the peripheral region 11, so that a refractive index of the peripheral region 11 is equal to that of a portion of the substrate 1 having no waveguide.

Otherwise, the peripheral region 11 can be obtained by another method, in which Ti is first diffused into the substrate 1 by a pattern including the waveguides 2 and 3 and the peripheral region 11, and a refractive index of the peripheral region 11 is then lowered by injecting a refractive index lowering material such as boron, etc. into the peripheral region 11. Furthermore, the peripheral region 11 may be obtained by a further method, in which Ti is first diffused into the substrate 1 by a pattern including the waveguides 2 and 3 and the peripheral region 11, a portion of the peripheral region 11 is secondly etched to be a grooved portion by dry etching method such as ion beam method, reactive ion beam method reactive ion method, etc., or by wet etching method such as chemical etching method using etchant, etc., and the grooved portion is finally buried with a material such as $SiO_2$, $SiON$, $Si_3N_4$, $ZnO_2$, $Al_2O_3$, $LiNbO_3$, $InO_2$, $SnO_2$, $ZrO_2$, $Nb_2O_5$, etc. having a refractive index lower than that of the optical waveguides 2 and 3.

In a specific example of this preferred embodiment, the optical waveguides 2 and 3 and the island region 10 are provided by diffusing Ti into the substrate 1, while the peripheral region 11 is provided by non-doped region of the substrate 1. In this case, an optical waveguide circuit having a property of a low intersecting loss is fabricated only by the step of Ti-diffusion. More specifically, Ti is diffused into the substrate 1 to provide the optical waveguides 2 and 3 and the island region 10 at a temperature of 1050° C. for eight hours by a thickness of 630 Å. Then, the optical waveguides 2 and 3 having the width W of 9 $\mu m$ are obtained. In this circumstance, single mode is maintained at this intersection, if the width $W_1$ of the island region 10 ranges from 3 to 10 μm, and the loss can be suppressed to a predetermined extent, if the width $W_2$ of the peripheral region 11 which is otherwise defined to be a gap between the island region 10 and each of the waveguides 2 and 3 ranges from 0.2 to 5 μm, although the loss changes dependent on a refractive index of the peripheral region 11. When the intersecting angle $\theta$ is 7° (seven degrees), the intersecting loss is approximately 0.35 dB for TM polarization in the conventional structure as shown in FIG. 1B, while it is decreased to be approximately 0.1 dB in the structure of this invention as shown in FIG. 2.

When the width $W_2$ is larger than a predetermined maximum width, a coupling loss between the island region 10 and each of the optical waveguides 2 and 3 becomes large. On the other hand, when the width $W_2$ is smaller than a predetermined minimum width, the intersecting loss can not be improved.

Figure 3:
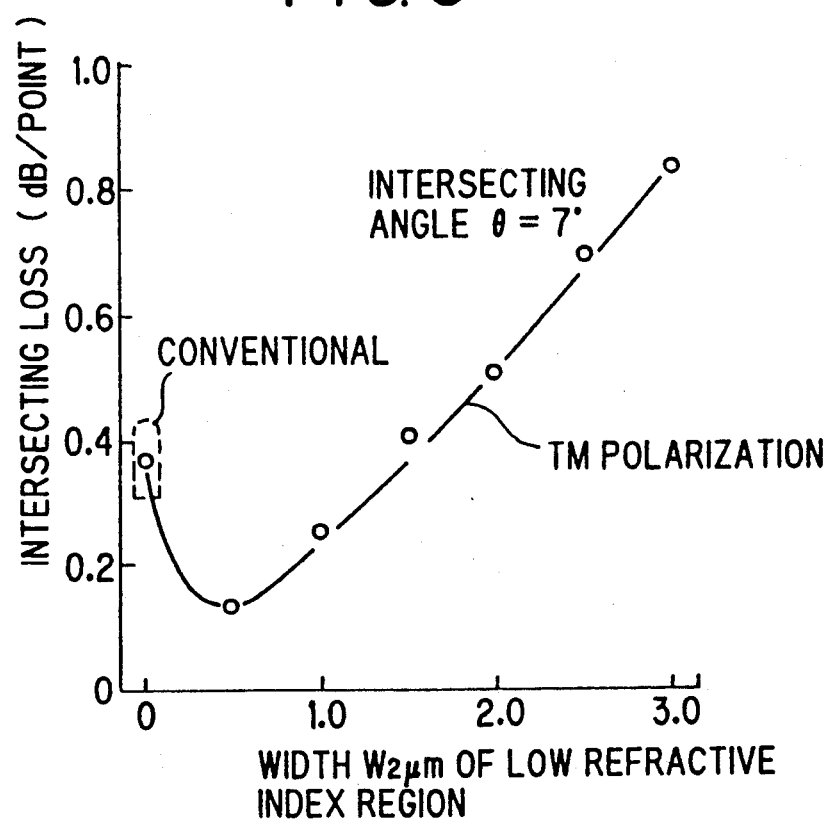
FIGS. 3 and 4 are graphs showing intersecting losses relative to a width of a low refractive index region and an intersecting angle, respectively.
Figure 4:
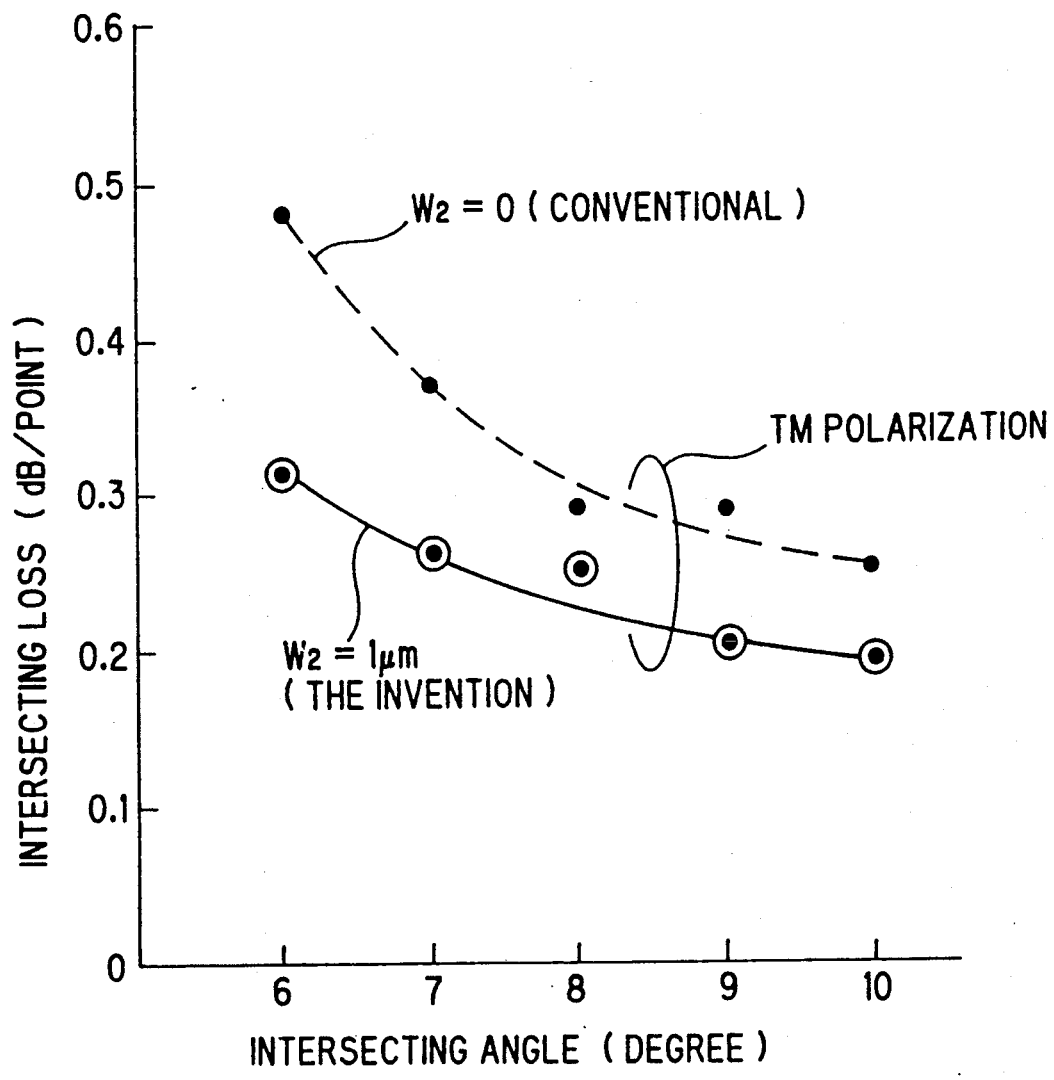

In this preferred embodiment, when an input light having a wavelength of 1.3 μm is supplied to one of the optical waveguides 2 and 3 intersecting with each other at an angle $\theta$ of 7° (seven degrees), an intersecting loss is measured relative to the width $W_2$ of the peripheral region 11 as shown in FIG. 3. On the other hand, when the intersecting angle $\theta$ changes, the intersecting loss is measured as shown in FIG. 4. At this time, a width of Ti-diffusion is 9 μm, a film thickness of Ti is 630 Å, a diffusion temperature is 1050° C., and a diffusion time is eight hours. As understood from FIG. 4, the intersecting loss is lowered in this invention as compared to the conventional structure by approximately 0.1 db, even if the intersecting angle $\theta$ is larger than 6° (six degrees).

In this invention, a substrate of glass, silicon, sapphire, etc. may be used in place of a substrate of lithium niobate, and an optical waveguide obtained by proton-exchange on the glass or lithium niobate substrate, or formed by deposition of quartz on the silicon or sapphire substrate may be used in place of an optical waveguide of Ti diffused into the lithium niobate substrate.

Although the invention has been described with respect to specific embodiment for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical waveguide circuit with intersections, comprising:
    a plurality of single mode optical waveguides provided on a substrate; and
    intersections each provided by two single mode optical waveguides among said plurality of said single mode optical waveguides, said two single mode optical waveguides intersecting with each other by a predetermined intersecting angle;
    wherein each of said intersections includes an island region, and a peripheral region which is provided at a periphery of said island region, said peripheral region having a refractive index which is lower than that of said plurality of said single mode optical waveguides, and having a predetermined width to decrease an intersecting loss induced by mode conversion.

2. An optical waveguide circuit with intersections, according to claim 1, wherein:
    said island region has a refractive index which is equal or proximate to that of said plurality of said optical waveguides.

3. An optical waveguide circuit with intersections, according to claim 1, wherein:
    said island region has a width so as to transmit light from said optical waveguides in a single mode.

4. An optical waveguide circuit with intersections, according to claim 1, wherein:
    said predetermined intersecting angle is an angle in a predetermined angle range, said predetermined angle range includes angles which exceed six degrees.

5. An optical waveguide circuit with intersections, according to claim 1, wherein:
    said peripheral region has a refractive index which is equal or proximate to that of said substrate.

6. An optical waveguide circuit with intersections, according to claim 1, wherein:
    said island region has a predetermined width which is equal or proximate to the width of said single mode optical waveguides.

* * * * *